(12) United States Patent
Morovic et al.

(10) Patent No.: US 10,694,048 B2
(45) Date of Patent: Jun. 23, 2020

(54) CONFIGURING PRINTER OPERATION USING COLORANT INFORMATION ON COLORANT UNITS

(71) Applicant: HEWLETT-PACKARD DEVELOPMENT COMPANY, L.P., Houston, TX (US)

(72) Inventors: Peter Morovic, Sant Cugat del Valle (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 18 days.

(21) Appl. No.: 15/834,465

(22) Filed: Dec. 7, 2017

(65) Prior Publication Data

US 2018/0097943 A1    Apr. 5, 2018

Related U.S. Application Data

(63) Continuation of application No. 14/762,790, filed as application No. PCT/EP2013/051597 on Jan. 28, 2013, now Pat. No. 9,883,053.

(51) Int. Cl.
*H04N 1/00* (2006.01)
*H04N 1/60* (2006.01)
(Continued)

(52) U.S. Cl.
CPC ........ *H04N 1/00015* (2013.01); *B41J 2/1752* (2013.01); *B41J 2/17546* (2013.01);
(Continued)

(58) Field of Classification Search
CPC ........... H04N 1/00015; H04N 1/00023; H04N 1/00066; H04N 1/00068; H04N 1/00082;
(Continued)

(56) References Cited

U.S. PATENT DOCUMENTS

| | | | |
|---|---|---|---|
| 5,610,635 A | 3/1997 | Murray et al. | |
| 6,375,298 B2 | 4/2002 | Purcell | |
| 6,431,673 B1* | 8/2002 | Heim | B41J 2/04535 347/14 |
| 6,533,383 B1 | 3/2003 | Saruta | |
| 6,565,198 B2 | 5/2003 | Saruta | |
| 6,817,693 B2* | 11/2004 | Phillips | B41J 2/17509 347/19 |

(Continued)

FOREIGN PATENT DOCUMENTS

| | | |
|---|---|---|
| CN | 101595720 | 12/2009 |
| EP | 1973334 | 9/2008 |

(Continued)

OTHER PUBLICATIONS

Boll; "Color-to-colorant Transformation for a Seven Ink Process"; IS&T/SPIE 1994 International Symposium on Electronic Imaging: Science and Technology; (cont. from above) International Society for Optics and Photonics; 1994.

(Continued)

*Primary Examiner* — Scott A Rogers
(74) *Attorney, Agent, or Firm* — HP Inc. Patent Department

(57) ABSTRACT

A printer apparatus comprises one or more ports ($201_1$ to $201_M$) for receiving one or more colorant units ($INK_1$ to $INK_N$), and a processing unit. The processing unit is adapted to determine which one or more colorant units ($INK_1$ to $INK_N$) have been loaded into the printer apparatus. The processing unit is adapted to retrieve colorant information from each loaded colorant unit ($INK_1$ to $INK_N$), and determine an ink-set configuration using the colorant information retrieved from each loaded colorant unit ($INK_1$ to $INK_N$). Operation of the printer apparatus is configured according to the determined colorant-set configuration.

20 Claims, 4 Drawing Sheets

(51) Int. Cl.
*B41J 2/21* (2006.01)
*B41J 2/175* (2006.01)
*G03G 21/18* (2006.01)
*H04N 1/54* (2006.01)

(52) U.S. Cl.
CPC ............ *B41J 2/21* (2013.01); *G03G 21/1878* (2013.01); *H04N 1/0009* (2013.01); *H04N 1/00023* (2013.01); *H04N 1/00034* (2013.01); *H04N 1/00045* (2013.01); *H04N 1/00063* (2013.01); *H04N 1/00066* (2013.01); *H04N 1/00068* (2013.01); *H04N 1/00087* (2013.01); *H04N 1/00938* (2013.01); *H04N 1/54* (2013.01); *H04N 1/60* (2013.01); *H04N 1/603* (2013.01); *H04N 1/6033* (2013.01); *H04N 1/6055* (2013.01); *H04N 1/6058* (2013.01); *H04N 1/6097* (2013.01); *G03G 2215/0695* (2013.01); *G03G 2221/1823* (2013.01); *H04N 2201/0082* (2013.01)

(58) Field of Classification Search
CPC .......... H04N 1/00084; H04N 1/00087; H04N 1/0009; H04N 1/00938; H04N 1/00949; H04N 1/60–6097; G06K 15/027; G06K 15/1859; G06K 15/1861; G06K 15/1878; G06K 15/4005; G06K 15/401; G06K 15/4015; G06K 15/402; G06F 3/1204; G06F 3/1205; G06F 3/1208; G06F 3/1211; G06F 3/1212; G06F 3/1218; G06F 3/1219; G06F 3/122; G06F 3/1224; G06F 3/1225; G06F 3/1227; G06F 3/1229; G06F 3/123; G06F 3/1232; G06F 3/1285; G06F 3/1287; G06F 3/1293; G06F 3/1296; B41J 2/1752; B41J 2/17543; B41J 2/17546; G03G 15/0863; G03G 21/1875; G03G 21/1878; G03G 21/1889; G03G 21/1892; G03G 2215/0695; G03G 2215/0697; G03G 2221/1823

See application file for complete search history.

(56) References Cited

U.S. PATENT DOCUMENTS

| | | |
|---|---|---|
| 6,955,411 B2 | 10/2005 | Saruta |
| 6,969,140 B2 | 11/2005 | Saruta |
| 7,123,380 B2 | 10/2006 | Van de Capelle |
| 7,366,430 B2 * | 4/2008 | Shishikura ......... G03G 15/0152 399/227 |
| 7,431,436 B1 | 10/2008 | Mills et al. |
| 7,841,686 B2 | 11/2010 | Kyoshima |
| 7,845,750 B2 | 12/2010 | Kobayashi |
| 8,220,890 B2 | 7/2012 | Hashi |
| 8,619,303 B2 | 12/2013 | Miura |
| 2002/0149785 A1 | 10/2002 | Chu |
| 2002/0191046 A1 | 12/2002 | Otsuki |
| 2003/0234942 A1 * | 12/2003 | Jeran ........................ H04N 1/54 358/1.9 |
| 2005/0259295 A1 * | 11/2005 | Nagao .................... G06K 15/00 358/2.1 |
| 2009/0213392 A1 * | 8/2009 | Hoshii ...................... H04N 1/54 358/1.9 |
| 2010/0026741 A1 * | 2/2010 | Gold ..................... B41J 2/0057 347/7 |
| 2012/0140005 A1 | 6/2012 | Devoeght |
| 2012/0194592 A1 | 8/2012 | Bhaumik et al. |
| 2013/0215440 A1 | 8/2013 | Chandermohan |
| 2015/0029564 A1 * | 1/2015 | Sakane .................. G03G 15/50 358/518 |

FOREIGN PATENT DOCUMENTS

| | | |
|---|---|---|
| IN | 2414/MUM/2008 | 8/2010 |
| JP | 2001111862 | 4/2001 |
| JP | 2005136752 A * | 5/2005 |
| JP | 2007099836 | 4/2007 |

OTHER PUBLICATIONS

International Search Report; European Patent Office; dated Sep. 6, 2013; PCT Patent Application No. PCT/EP2013/051597.

* cited by examiner

CONFIGURING PRINTER OPERATION USING COLORANT INFORMATION ON COLORANT UNITS

CROSS-REFERENCE TO RELATED APPLICATION

This application is a Continuation of U.S. application Ser. No. 14/762,790 filed in the U.S. Patent and Trademark Office on Jul. 22, 2015, which is a U.S. National Stage Application of and claims priority to International Patent Application No. PCT/EP2013/051597, filed on Jan. 28, 2013, and entitled "PRINTER APPARATUS AND METHOD," which is hereby incorporated by reference in its entirety.

BACKGROUND

A printer apparatus is conventionally designed for use with a specific set of colorants (a colorant-set). For example, some ink-jet printers are designed for use with an ink-set comprising just a black ink cartridge in combination with a single color ink cartridge, while other printers are designed for a four-color printing process having four individual ink cartridges corresponding to black, cyan, magenta and yellow (known as CMYK), while other printer apparatus are specifically designed for a six-color printing process having four individual ink cartridges corresponding to black, cyan, magenta and yellow, plus light dye load colorants corresponding to light-cyan and light-magenta (known as CMYKcm). Other printer systems use additional ink cartridges, such as orange and green to further enhance the gamut of the printers. Other printing systems may additionally use one or multiple other spot colours such as specific Pantone colours or specialty inks such as metallic inks.

In each of these examples a particular printer apparatus is static in design, in so far as the colorant-set used in a particular printer apparatus is determined when designing the printer, with the colorant-set then determining which resources are used in that printer, both hardware and software resources (such as color maps and media presets, etc.). This means that a particular printer is only capable of using the colorant-set is was designed for.

SUMMARY

According to a first example there is provided a method for controlling the operation of a printer apparatus. The method comprises the steps of determining which one or more colorant units have been loaded into the printer apparatus. Colorant information is retrieved from each loaded colorant unit, and a colorant-set configuration determined using the colorant information retrieved from each loaded colorant unit. The operation of the printer apparatus is configured according to the determined colorant-set configuration.

According to another example, there is provided a printer apparatus comprising one or more ports for receiving one or more colorant units. The printer apparatus comprises a processing unit adapted to: determine which one or more colorant units have been loaded into the printer apparatus; retrieve colorant information from each loaded colorant unit; determine a colorant-set configuration using the colorant information retrieved from each loaded colorant unit; and configure the operation of the printer apparatus (200) according to the determined ink-set configuration.

According to another example there is provided a colorant unit adapted to store information that may be retrieved by a printer apparatus for identifying one or more characteristics of one or more colorants contained in the colorant unit. The colorant information provides data relating to the constituent part that each colorant plays in an overall colorant-set configuration for a printer apparatus.

BRIEF DESCRIPTION OF THE DRAWINGS

For a better understanding, and to show more clearly how the examples described below may be carried into effect, reference will now be made, by way of example only, to the following drawings in which.

DETAILED DESCRIPTION

Some examples illustrated below are described in relation to an ink-jet printer apparatus that receives ink cartridges. It is noted, however, that the examples can be used with any type of printer apparatus or printing technique (including laser printers, Liquid Electrophotographic (LEP) or digital press printers, Hewlett-Packard Indigo™ printers, xerography printers, offset press printers, thermal wax printers, dye transfer printers, or any other type of printer). The examples may also be used with any type of colorant (for example ink, including liquid ink and dry ink, wax, powder, dye, toner or any other type of colorant). The examples described below are also intended to embrace a colorant being stored in any form of colorant unit. For example, a colorant unit (or color station) may be configured to store a single colorant, or a single colorant in combination with a print head, or one or more colorants in combination with (or without) one or more print heads.

The examples described below provide a printer apparatus that enables a variety of colorant-set configurations to be used on the same printer apparatus.

This has the advantage of enabling flexibility in the design of printers, and allows for post-introduction updates to be made. For example, in an ink-jet printer this enables new ink-sets to be introduced (for example having different colored inks, different configurations) for use with the printer apparatus, as well as mid-life updates of the same-inks.

Figure 1:
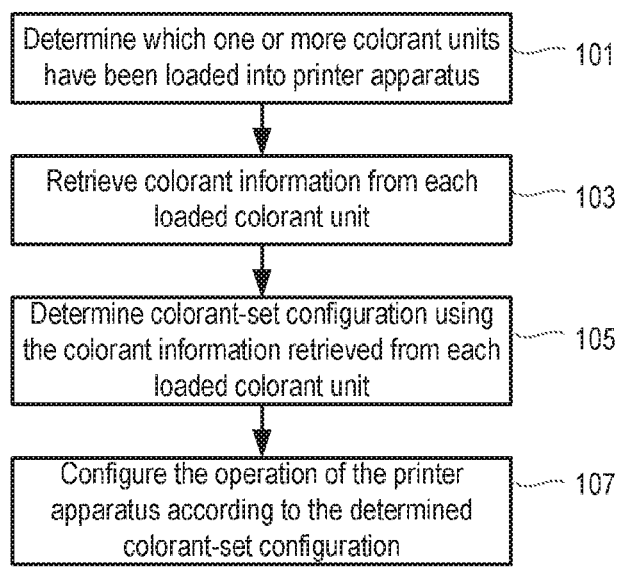
FIG. 1 shows a method according to a first example.

FIG. 1 shows a method according to a first example. The method comprises the step of determining which one or more colorant units, for example ink cartridges, have been loaded into the printer apparatus, step 101. Colorant information (for example ink information) is retrieved from each loaded colorant unit, step 103. A colorant-set configuration (for example an ink-set configuration) is determined using the colorant information retrieved from each loaded colorant unit, step 105. The operation of the printer apparatus is then configured according to the determined colorant-set configuration, step 107.

This has the advantage of providing a fully flexible system, for example whereby any ink-set configuration can be used by a particular ink-jet printer, such that a printer can be adapted to work with any set of ink colorants.

The examples enable a printer to be provided that can use either a CMYKcm configuration or a CMYK+dark Grey+ light Grey configuration, depending on the needs and preferences of a particular customer.

It is noted that the printer apparatus can comprise any number of slots or ports for receiving colorant units. For example, in an ink-jet printer a plurality of slots may be provided for receiving a plurality of ink cartridges. The ink cartridges may or may not comprise a respective print head. In another example, a laser printer may have a plurality of different colorants contained within a single colorant unit, for example a single toner cartridge. Other printer apparatus may also comprise different configurations of colorant unit(s), depending upon the particular type of printer. As noted above, the examples are intended to be used with any type of printer, having any number of slots or ports for receiving colorant unit(s).

It is noted that the printer apparatus can be configured to determine a colorant-set configuration (for example an ink-set configuration) based on each slot or port being loaded with a corresponding colorant unit (such as an ink cartridge), or with one or more such slots or ports being empty (or filled with dummy colorant units or ink cartridges).

The colorant information retrieved from a respective colorant unit comprises information relating to one or more characteristics of a colorant contained in the respective colorant unit. By providing information relating to the characteristics of the colorant, this enables such information from each loaded colorant unit to be used in combination to determine the overall colorant-set configuration, and thus how the printer should be configured. The colorant information provided by each colorant unit effectively provides data relating to the constituent part that each particular colorant plays in an overall colorant-set configuration for a printer apparatus.

According to one example, a characteristic of a colorant comprises one or more of reflectance information relating to the colorant, reflectivity information relating to the colorant, opacity information relating to the colorant, transmissivity information relating to the colorant, information relating to a drop or particle weight of the colorant, information relating to a drop or particle shape of the colorant, or information relating to a drop or particle size of the colorant.

For example, in an ink-jet printer a characteristic of a colorant comprises one or more of ink colorant information, an ink reflectance information, an ink reflectivity information, ink opacity information, ink transmissivity information, information relating to a drop weight of an ink, information relating to a drop shape of an ink, or information relating to a drop size of an ink.

The step of configuring the operation of the printer apparatus may comprise the step of configuring a hardware and/or firmware and/or software resource of the printer apparatus according to the determined colorant-set configuration.

According to one example configuring the operation of the printer apparatus comprises the step of computing a new color separation for the determined colorant-set configuration.

For example, given the colorant information (such as ink information) retrieved from the available colorant units (for example ink cartridges), a set-up chart is printed and measured (if such capabilities are available in a particular printer) and based on the results of the measurements a computation of a printing pipeline is set-up. The computation of the pipeline can be carried out either locally or remotely, or a combination of both. Such a procedure can be carried out when the colorant information contained in the colorant units is comparatively limited (for example when only drop or particle weight information is available, so that operation of the printer apparatus can respect a colorant limit approximately) but still enable a pipeline from any colorant-set to be configured correctly.

According to one example, the step of determining a colorant-set configuration comprises the steps of comparing the colorant information from the colorant unit or units loaded in the printer apparatus with a predetermined set of valid colorant-set configurations, and configuring the operation of the printer apparatus only if the colorant-set configuration matches one of the predetermined set.

This example provides a simpler solution whereby a predetermined set of valid colorant configurations are possible, which can save computation in the printer because the configuration parameters for each of the limited set of colorant-set configurations can be carried out in advance.

The step of configuring the operation of the printer apparatus may comprise the step of communicating with a remote entity, and receiving information from the remote entity for configuring at least part of the operation of the printer apparatus.

In such an example part or all of the computation is carried out somewhere other than the printer itself, such as a cloud/web interface. This has the advantage of not having to rely on the more limited processing power of the printer itself to determine the operation of the printer for a new colorant-set configuration.

Depending on the loaded colorant unit(s), the printer apparatus recognizes the valid colorant-set configuration and determines the appropriate resources to be used. Furthermore, given a computationally built pipeline such as a Halftone Area Neugebauer Separation (HANS) pipeline, the information on the colorant unit could directly pertain to the characteristics of the colorant (for example reflectance, opacity, drop or particle weight, or other characteristic of the colorant) and allow for a fully configurable set-up whereby, based on the colorant information retrieved from all loaded colorant units, a new color separation is computed. As will be well understood, Halftone Area Neugebauer Separation (HANS) is a color separation and halftoning paradigm in which Neugebauer Primary area coverage (NPac) space separation (for example optimized for minimum use or colorant) and halftoning is used as a printing process.

Figure 2:
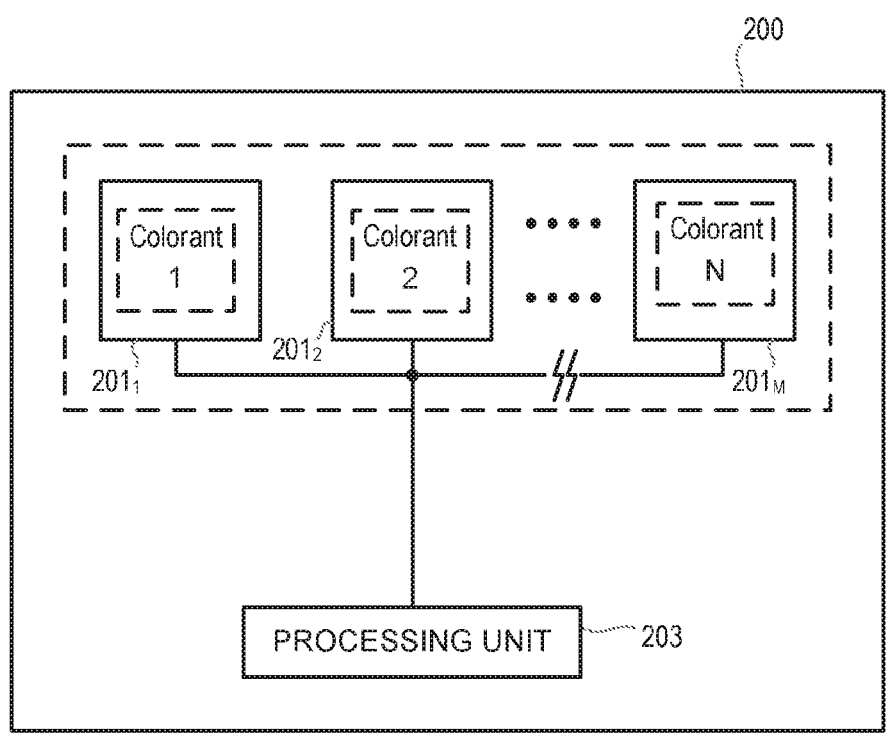
FIG. 2 shows a printer apparatus according to another example.

FIG. 2 shows an example of a printer apparatus 200 according to another example. The printer apparatus comprises one or more ports $201_1$ to $201_M$ for receiving one or more colorant units $COLORANT_{1-N}$ (for example one or more ink cartridges). The printer apparatus 200 comprises a processing unit 203 that is adapted to determine which one or more colorant units $COLORANT_{1-N}$ have been loaded into the printer apparatus 200. The processing unit is adapted to retrieve colorant information (for example ink information) from each loaded colorant unit, and determine a colorant-set configuration using the colorant information retrieved from each loaded colorant unit $COLORANT_{1-N}$. The operation of the printer apparatus 200 is configured according to the determined colorant-set configuration.

As mentioned above, the colorant information retrieved from a colorant unit may comprise information relating to one or more characteristics of a colorant, including one or more of reflectance information relating to the colorant, reflectivity information relating to the colorant, opacity information relating to the colorant, transmissivity information relating to the colorant, information relating to a drop or particle weight of a colorant ink, information relating to a drop or particle shape of a colorant, or information relating to a drop or particle size of a colorant. It is noted that other characteristics may also be used, without departing from the scope of the examples.

For an ink-jet printer for example, the one or more characteristics comprise ink reflectance information, ink reflectivity information, ink opacity information, ink transmissivity information, information relating to a drop weight of an ink, information relating to a drop shape of an ink, or information relating to a drop size of an ink.

Although the number of colorant units (for example ink cartridges) N may match the number of available slots (or ports) M in the printer apparatus, as noted above the examples can be configured to determine a colorant-set configuration when N is less than M, or when dummy colorant units are loaded into certain slots. This enables a printer apparatus to have more slots than are necessarily needed when the printer is designed, so that more colorant units (and hence colorants) can be introduced for use with the printer apparatus at a later date. Also, this enables a printer apparatus to be used with a first number of colorant units during a first mode for operation, for example by one user, and a second number of colorant units used during a second mode of operation, for example by a different user, or when a particular user requires a different quality of printing.

According to one example, the processing unit 203 is adapted to configure a hardware and/or firmware and/or software resource of the printer apparatus according to the determined colorant-set configuration.

The processing unit 203 may be adapted to compute a new color separation for the colorant-set configuration according to the determined colorant-set configuration.

According to one example the processing unit 203 is adapted to compare the colorant information from the colorant unit or units loaded into the printer apparatus with a predetermined set of valid colorant-set configurations, and configure the operation of the printer only if the colorant-set configuration matches one of the predetermined set.

Figure 3:
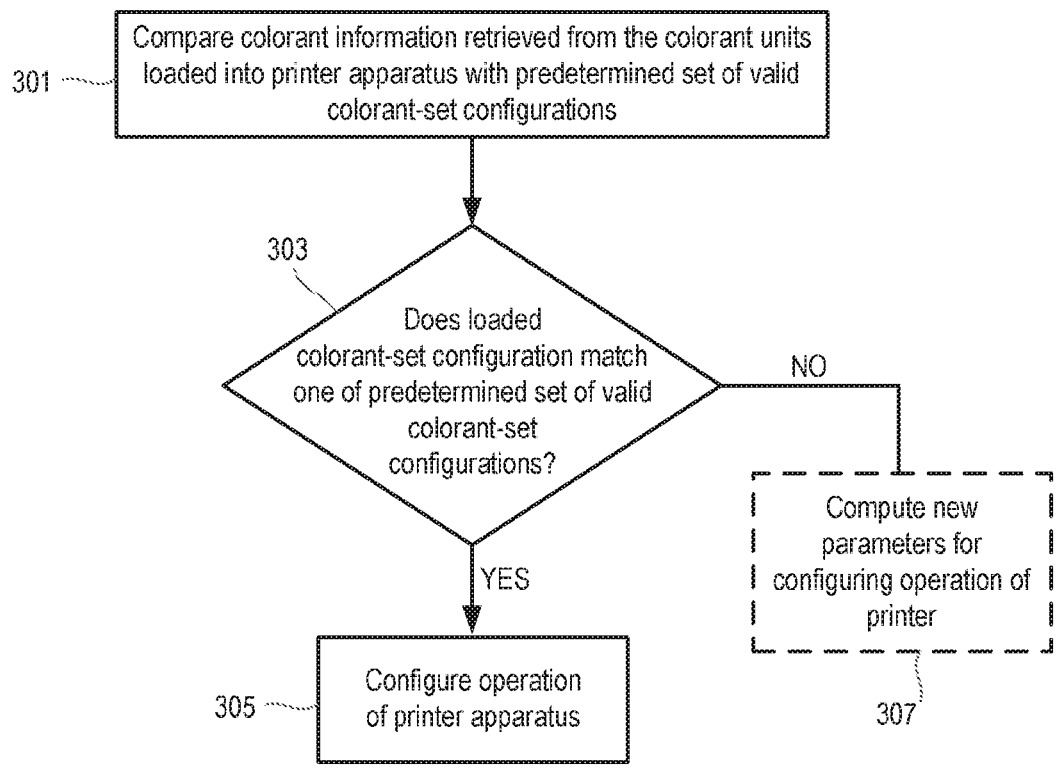
FIG. 3 shows a method according to another example.

Referring to FIG. 3, in step 301 colorant information received from colorant units loaded into the printer apparatus is compared with a predetermined set of valid colorant-set configurations. The valid colorant-set configurations may comprise a set of colorant-set configurations which the printer apparatus has previously been configured to operate with. In step 303 the method comprises the step of determining whether the loaded colorant-set configuration matches one of the predetermined set of colorant-set configurations. If so, the operation of the printer apparatus is configured accordingly, step 305.

With such an example the predetermined colorant-set configurations enable the operation of the printer apparatus to be configured without complex computation. In other words, the printer apparatus, or a remote entity, has previously computed how the printer apparatus should be configured for each of the possible valid colorant-set configurations, such that the printer is then able to compare which of these matches the loaded colorant set configuration, and adapt the operation of the printer accordingly.

In the event that the loaded colorant-set configuration does not match any of the predetermined set of valid colorant-set configurations, the printer apparatus may have the option of computing parameters for configuring the operation of the printer, step 307. This may involve computation or processing carried out at the printer apparatus itself and/or at a remote entity.

The processing unit 203 can also be adapted to communicate with a remote entity, and adapted to receive information from the remote entity for configuring at least part of the operation of the printer apparatus.

Figure 4:
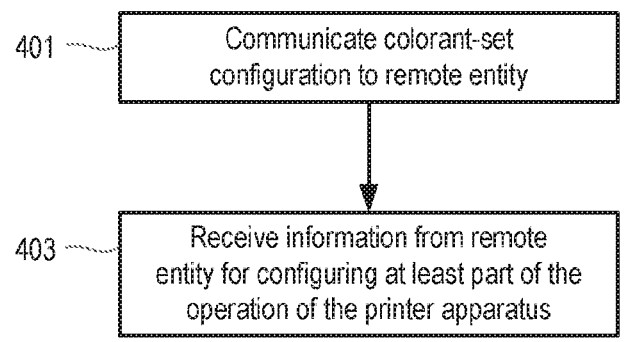
FIG. 4 shows a method according to another example.

FIG. 4 shows the method steps that are performed by such an example. In step 401 the printer apparatus communicates the colorant-set configuration it has determined to a remote entity, such as a host unit connected via the internet, or a cloud based entity. The remote entity is then able to compute whatever complex data processing may be needed to determine how the printer apparatus needs to be reconfigured. For example, the remote entity may need to compute new printer driver software. The printer apparatus then receives information from the remote entity, step 403, for configuring at least part of the operation of the printer apparatus.

Figure 5:
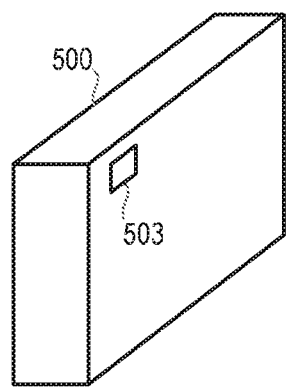
FIG. 5 shows an ink cartridge according to an example.

FIG. 5 shows an example of a colorant unit 500 according to another example. The colorant unit 500 is adapted to store information 503 that may be retrieved by a printer apparatus for identifying one or more characteristics of one or more colorants contained in the colorant unit. In particular, the colorant information 503 provides data relating to the constituent part that each colorant plays in an overall colorant-set configuration for a printer apparatus.

The colorant information 503 comprises information relating to the characteristics of a colorant contained in the colorant unit, including one or more of reflectance information relating to the colorant, reflectivity information relating to the colorant, opacity information relating to the colorant, transmissivity information relating to the colorant, information relating to a drop or particle weight of a colorant, information relating to a drop or particle shape of a colorant, or information relating to a drop or particle size of a colorant. Data relating to other characteristics of the colorant may also be stored in the colorant unit, or indeed any other form of data.

The examples described above have the advantage of allowing the appeal of a single printer to be broadened to a wider market segment. For example, in an ink-jet printer this enables different quality ink-sets to be used on the same type of printer by different users, depending on the quality of printing required by a particular user.

The examples embed additional information in the colorant units, such as ink cartridges or color stations, in order to determine the loaded configuration of a particular colorant-set, and the consequent use of resources seamlessly.

This has the advantage of enabling a printer design whereby the set of colorants loaded into the printer determines the resources to be used (for example if these are from a predetermined set of possible colorant configurations, or generates them in the cloud or locally) with no direct constraint as to what configuration is possible. For example, a CMYK configuration could be used for a fast setup while CMYKRG could be used for maximum spot-color coverage or improved ink usage, and CMYK+lightGray+darkGray for best grayscale printing. The examples are able to provide such functionality in view of each colorant unit containing information pertaining to the colorant it contains, be it the reflectance (or reflectivity), opacity (or transmissivity), or other characteristic of the colorant. This enables the printer apparatus (and/or remote entity) to determine full Neugebauer Primary colorimetry via a Kubleka/Munk model for example, or additionally drop or particle weight, shape, size etc., information which can be used to further tune a general set of resources.

This information can be both used as selectors in the sense that they simply determine which resources to use as well as validate the colorant units, or more comprehensively, they can be values that are parameters for a computation of actual resources to be used with these colorants. Coupling this functionality with a web connected printer also means that deploying new custom colorant-configurations is straightforward. It is possible to announce a new "valid" configuration, or introduce a single new colorant (for example a new ink, whereby a customer buys a new ink cartridge), and whereby the printer recognizes it and computes and/or downloads any resources needed in addition to the parameters read from the ink-cartridge itself. A cloud/web interface can be used to perform the computation of the color resources on powerful servers instead of the printer apparatus itself (according to some examples), delivering true flexibility and improved user experience that does not mean having to wait for the computation on slow/weak hardware in the printer.

The features provided by the examples can be deployed globally, but also provides flexibility to develop custom solutions for large customers or users, such as adding one (or more) additional colorants in order to suit corporate spot-color coverage for a given customer. It will be appreciated that if a configuration of a printer is being changed from one to another, the printer apparatus may need to flush colorants and clean pens or heads from the previous colorant configuration, before operating under the new configuration.

The examples have the advantage of delivering a single printer with various colorant-sets (instead of having to deliver them as separate printers). It is also possible to provide a close, explicit tie between a colorant-set loaded in a printer apparatus and the resources needed to use them (a form of "smart" colorant unit or ink-cartridge). This provides the flexibility to deliver new colorant configurations post-introduction of a printer apparatus, and the flexibility to deliver custom colorant-configurations for large customers, or flexibility to couple arbitrary colorant-configurations with on-line or cloud computation of color resources (e.g. a customer loads Cyan, Black, light Gray, dark Gray and Silver inks, the printer reads the parameters from the ink-cartridges and either computes pipeline resources locally or uploads them to a cloud service that computes them—which can be especially relevant for a HANS-pipeline).

As mentioned above, the examples can be employed in a printer apparatus having any number of slots or ports for receiving colorant units. In addition, the examples can be used in a printer apparatus that comprises a certain number of slots, for example 10 slots/ports for receiving colorant units, but with colorant units only being loaded into a sub-set of these slots, for example 6 of these slots in one mode, and the colorant-set configuration determined accordingly (or 8 inserted during a different mode, and the colorant-set configuration re-determined accordingly). Some examples may apply certain constraints as to which slots can be used in conjunction (for example to optimise the use of print-heads some of which may use multiple colorants).

It is noted that the operation of the printer can also be reconfigured if one of the colorant units becomes empty or low on a particular colorant(s). In such an arrangement the printer apparatus can be reconfigured as if one of the colorants or colorant units is missing (or not loaded in the first place), and a colorant-set configuration determined for the new set of colorants or colorant units. This operation can be performed either automatically or manually upon a particular colorant unit becoming empty. Instead of N colorants that need to be configured, if one runs out it effectively becomes a system with N−1 colorants that need reconfiguring. It will be appreciated that, in practice, such an embodiment may have certain limitations imposed, as a particular colorant running out may result in a loss of colour gamut (or other characteristics) and therefore the inability to print content. For example, if a printer apparatus is a CMYK printer where "m" runs out, it is possible to dynamically reconfigure the pipeline to print with CYK, but certain colours may not print very well, whereas with another example if in a CMYKcm system where "c" runs out, it should be possible to continue relatively seamlessly with a reconfigured pipeline.

Information from the colorant units is therefore used to dynamically configure the operation of the printer on the fly, rather than being preset during the manufacture of the printer. Such reconfiguration is different from the limitations of the constrained use of existing spot colors, since known spot color systems must know in advance the specific spot colors that can be used in a particular printer apparatus, rather than determining in real time what colorants have been loaded into the printer, determining the colorant-set configuration, and then configuring the operation of the printer accordingly. The examples enable a previously unknown colorant of an unknown color to be used as a process colorant, i.e. to be freely combined with the other colorants. Spot colors can also be used seamlessly for any content, therefore giving access to a larger gamut or extended domain of image quality properties such as grain, in addition to using a spot color as its intended purpose as a spot color. This also enables the lack of one of the basic inks, for example cyan, to be replaced by using a spot color ink, for example blue, and doing so computationally and dynamically by determining a new colorant-set configuration, and adapting the operation of the printer accordingly.

It should be noted that the above-mentioned examples illustrate rather than limit the concepts described herein, and that those skilled in the art will be able to design many alternative examples without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A container to store information retrieved by a rendering apparatus for identifying a characteristic of content contained in the container, wherein the information:
   allows the rendering apparatus to determine:
      hardware resources of the rendering apparatus to be used; and
      a printing pipeline to be used; and
   provides data relating to a constituent part that each content plays in an overall content-set configuration for the rendering apparatus.

2. The container of claim 1, wherein the content comprises powder content.

3. The container of claim 1, wherein the container is an ink cartridge that contains colorant.

4. The container of claim 1, wherein the data is to configure a hardware resource of the rendering apparatus according to the overall content-set configuration.

5. The container of claim 1, wherein the information allows the rendering apparatus to compute how the rendering apparatus is to be configured.

6. The container of claim 1, wherein the information allows the rendering apparatus to compute a new color separation for the content-set configuration.

7. The container of claim 1, wherein the information allows the rendering apparatus to print and measure a set-up chart.

8. The container of claim 1, wherein the information allows the rendering apparatus to compare the content information with a predetermined set of valid content-set configurations.

9. The container of claim 1, wherein the information allows the rendering apparatus to recompute how the rendering apparatus is to be configured when the content contained in the container is below a predetermined amount.

10. A system comprising an ink cartridge to store colorant and electronic information retrieved by a rendering apparatus for identifying characteristics of colorants contained in colorant units, wherein the information:
  allows the rendering apparatus to determine:
    hardware resources of the rendering apparatus to be used with the colorants;
    a printing pipeline to be used; and
    a new printer driver to download; and
  provides data relating to a constituent part that each colorant plays in an overall colorant-set configuration for the rendering apparatus.

11. The system of claim 10, wherein the information comprises information relating to characteristics of a colorant contained in the colorant unit, including at least one of the elements selected from the group consisting of: reflectance information relating to the colorant, reflectivity information relating to the colorant, opacity information relating to the colorant, transmissivity information relating to the colorant, information relating to a drop or particle weight of the colorant, information relating to a drop or particle shape of the colorant, or information relating to a drop or particle size of the colorant.

12. The system of claim 10, wherein the information includes information from which the rendering apparatus determines at least one of full colorimetry, drop weight, drop, shape, and drop size.

13. The system of claim 10, wherein the information includes parameters for a computation of additional resources to be used with the colorants.

14. The system of claim 10, wherein the information includes information which instructs the rendering apparatus to download additional resources to be used with the colorants.

15. The system of claim 10, further comprising the rendering apparatus, the rendering apparatus comprising:
  at least two ports to receive colorant units; and
  a processor to:
    constrain which ports are used in conjunction with one another;
    determine which colorant units have been loaded into the rendering apparatus;
    retrieve colorant information from each loaded colorant unit;
    determine a colorant-set configuration using the colorant information retrieved from each loaded colorant unit; and
    configure the operation of hardware resources of the rendering apparatus according to the determined colorant-set configuration.

16. The system of claim 15, wherein configuring the operation of hardware resources comprises setting up a printing pipeline based on just drop weight information.

17. The system of claim 15, wherein at least one of the at least two ports receives different colorant units at different times.

18. The system of claim 15, wherein configuring the operation of hardware resources of the rendering apparatus is performed on the fly.

19. The system of claim 15, wherein the information comprises information relating to characteristics of a colorant contained in the colorant unit, including at least one of the elements selected from the group consisting of reflectance information relating to the colorant, reflectivity information relating to the colorant, opacity information relating to the colorant, transmissivity information relating to the colorant, information relating to a drop or particle weight of the colorant, information relating to a drop or particle shape of the colorant, or information relating to a drop or particle size of the colorant.

20. The system of claim 10, wherein the information allows the rendering apparatus to compare the colorant information against a set of colorant-set configurations which the rendering apparatus has previously been configured to operate with.

* * * * *